United States Patent [19]

Ebner

[11] Patent Number: 4,457,905

[45] Date of Patent: Jul. 3, 1984

[54] PROCESS FOR OXIDATION AND AMMOXIDATION

[75] Inventor: Jerry R. Ebner, St. Charles, Mo.

[73] Assignee: Monsanto Company, St. Louis, Mo.

[21] Appl. No.: 453,089

[22] Filed: Dec. 27, 1982

[51] Int. Cl.³ ............................................. C01C 3/02
[52] U.S. Cl. .................................. 423/376; 568/402
[58] Field of Search ............... 423/372, 376; 252/437, 252/471; 568/402

[56] References Cited

U.S. PATENT DOCUMENTS

| | | | |
|---|---|---|---|
| 1,602,404 | 10/1926 | Frazer | 252/471 |
| 1,937,489 | 11/1933 | Jenness | 252/471 |
| 2,006,981 | 7/1935 | Andrussow | 423/376 |
| 3,911,089 | 10/1975 | Shiraishi et al. | 423/376 |
| 3,914,387 | 10/1975 | Von Jordan et al. | 423/555 |
| 4,120,824 | 10/1978 | Kruse | 568/402 |

FOREIGN PATENT DOCUMENTS 51-10200 1/1976 Japan .
54-126698 10/1979 Japan .

*Primary Examiner*—John Doll
*Assistant Examiner*—Wayne A. Langel
*Attorney, Agent, or Firm*—Thomas Y. Awalt, Jr.

[57] ABSTRACT

A process for the ammoxidation of methanol or formaldehyde to hydrogen cyanide or oxidation of methanol to formaldehyde using a catalyst comprising manganese and phosphorus, preferably as oxides, wherein the manganese to phosphorus atomic ratio is 1:1 to 1.5:1.

14 Claims, No Drawings

PROCESS FOR OXIDATION AND AMMOXIDATION

BACKGROUND OF THE INVENTION

1. Field of the Invention

The invention relates to the oxidation and ammoxidation of methanol or formaldehyde to hydrogen cyanide or methanol to formaldehyde.

2. Description of the Prior Art

Hydrogen cyanide is a basic chemical building block for many chemical processes. Hydrogen cyanide has been mainly produced by the ammoxidation of methane (Andrussow process) and is also obtained as a by-product in the preparation of acrylonitrile by the ammoxidation of propylene. Because hydrogen cyanide is poisonous, shipment of large amounts of hydrogen cyanide has been avoided. Usually hydrogen cyanide is produced and consumed at the same location.

Frequently, hydrogen cyanide-consuming facilities were developed next to facilities that produced hydrogen cyanide, e.g., acrylonitrile units. Recnt improvements in the catalyst for acrylonitrile production have resulted in increased yields of acrylonitrile at the expense of reduced yields of hydrogen cyanide. Accordingly, there has been quite a demand for better methods of making hydrogen cyanide from inexpensive, easily transportable, starting materials such as methanol or formaldehyde.

In Japanese Kokai No. 51 1976-10200, a metal oxide catalyst, for the ammoxidation of methanol to HCN, consisting of antimony and at least one of iron, cobalt, nickel, manganese, zinc, and uranium, with an atomic ratio of antimony to additional elements varying from 1:10 to 10:1 is disclosed. This catalyst can be used with or without a support, but a silica support is preferred.

Japanese Kokai No. 54 1979-126698 discloses a catalyst for ammoxidation of methanol of HCN, which catalyst is supported on 30 to 70 weight percent silica and has the following empirical formula:

$A_a MoBi_b Fe_f Na_n P_p O_q$ where A is potassium, rubidium, cesium, molybdenum, bismuth, iron, sodium, phosphorus, and oxygen and the subscripts represent the number of atoms of each component.

U.S. Pat. No. 3,911,089, the teachings of which are incorporated by reference, discloses a process for preparing hydrogen cyanide from methanol or formaldehyde using a catalyst primarily containing molybdenum and bismuth oxide. In its broadest teaching, there is disclosed catalyst whose active components correspond to the formula $Mo_a Bi_b Fe_c X_d Y_e Z_f O_g$ wherein X is Cr, Mn, Co, Ni, Zn, Cd, Sn, W or Pb. Y is one or more of Pi and elements of Group 1A or 2A in the Periodic Table. Z is one or more of P, As, and Sb. The catalyst can be used alone, or is preferably incorporated on a suitable carrier such as silica, alumina, diatomaceous earth, silicon carbide or titanium oxide.

The catalysts disclosed in the examples of this patent usually contain three to six active elements, not counting the support and oxygen. One of the catalysts disclosed contained small amounts of manganese and phosphorus, in addition to the molybdenum and bismuth which are the primary catalytic components. This catalyst is shown in Example 16, Table 3 and has the following composition:

$Mo_{12} Bi_1 P_{0.008} Fe_2 Ni_7 Mn_2 Tl_{0.530.5} 15Si_2$

When this catalyst was tested by the patentee for conversion of methanol into hydrogen cyanide, it was not especially active. It gave a 65% yield of hydrogen cyanide. Practically every other catalyst in Table 3 (a total of 21 catalysts) gave better yields, only three gave worse yields.

I wanted to develop an active catalyst system for use in the ammoxidation of methanol to hydrogen cyanide which would not require complicated catalyst manufacturing procedures and which would also give yields as good as or better than the more complicated prior art catalysts.

I discovered that a very simple catalyst system was effective for the ammoxidation of methanol to hydrogen cyanide, as long as the ratio of active catalytic elements was carefully maintained.

SUMMARY OF THE INVENTION

Accordingly, the present invention provides a process for the ammoxidation of methanol or formaldehyde feed to hydrogen cyanide comprising passing said feed along with ammonia and oxygen or oxygen-containing gas into an ammoxidation reaction zone operated at ammoxidation conditions and containing catalytically effective amounts of manganese and phosphorus and wherein the atomic ratio of manganese to phosphorus is within the range of 1:1 to 1.5:1.

In a more limited embodiment, the present invention provides a process for the ammoxidation of methanol to hydrogen cyanide comprising feeding to an ammoxidation reactor operated at ammoxidation reaction conditions, a feed containing methanol, ammonia and oxygen or oxygen-containing gas and wherein the ammoxidation reaction zone contains a fluidized bed of ammoxidation catalyst comprising $Mn_a PO_x$ wherein a is 1 to 1.5 and x is the total number of the oxygen atoms in the oxides of the other atoms, and hydrogen cyanide is produced in the ammoxidation reaction zone as a product of the process.

In another embodiment, the present invention provides a process for the production of carbonyl compounds comprising passing a feed of an alcohol and oxygen or oxygen-containing gas into a reaction zone operated at oxidation conditions and containing catalytically effective amounts of manganese and phosphorus and wherein the atomic ratio of manganese to phosphorus is within the range of 1:1 to 1.5:1.

DETAILED DESCRIPTION OF THE INVENTION

The catalyst that I used in my process can be prepared by conventional means. Soluble compounds of manganese and phosphorus can be dissolved in water, or a slurry of the catalytic elements can be formed. The solution or slurry can be mixed with the carrier, or allowed to dry as a cake, or spray-dried, or any other conventional catalyst finishing steps can be used. After drying, the catalyst is preferably subjected to conventional calcination, heating at 200 to 1000 C., preferably in an oxidizing atmosphere, to fix the catalyst composition.

Although the catalyst can be used neat, I prefer to operate with a support. Preferred are inert supports such as $TiO_2$, $Al_2O_3$, and other supports commonly used. Especially preferred is use of $SiO_2$. Preferably, the silica is added during the catalyst preparation, in two steps. First, a little silica is mixed in with the active catalytic components and the mixture is stirred for 1 to 3 hours at 80 to 100 C. Then, the rest of the silica support is added. This two-step addition of silica gives slightly better activity, and increases the HCN yield.

The manganese compounds that can be used include any which can be incorporated into a catalyst. Preferred compounds include manganese acetate, nitrate, oxide, chloride and similar compounds.

The phosphorus compounds that can be used include any that are known in the art, including $P_2O_5$, $H_3PO_4$, $NH_4H_2PO_4$, $(NH_4)_2HPO_4$, and similar compounds.

The ammoxidation reaction conditions used are those disclosed in the art for the ammoxidation of methanol and formaldehyde, typically, temperatures of 200 to 600 C., with better results obtained at 250 to 550 C., and best results being obtained at 300 to 500 C.

The molar ratio of reactants in the ammoxidation reaction zone is conventional. Usually, the molar ratio of ammonia and oxygen to methanol or formaldehyde is near stoichiometric so that most of the reactants will be consumed in the reaction. Usually, the ammonia to methanol, or formaldehyde, ratio is 0.7:1 to 2:1, preferably 0.9:1 to 1.3:1. Use of less ammonia increases the yield of formaldehyde from methanol, and formaldehyde is a valuable product. Use of excess ammonia is not desirable because the unreacted ammonia must be recovered and recycled, or wasted.

Air is the preferred oxygen source because it is cheap, however, pure oxygen or oxygen-enriched air may also be used. Flammable mixtures should be avoided.

Preferably, some steam is added to the reaction zone to cut down on the possibility of forming an explosive mixture and to increase the selectivity of the reaction for HCN. When steam is added it will usually be present in an amount equal to 1 to 20 mole percent of the reactants.

Inert diluents may be present, and their use is common in laboratories, but not common commercially, except for nitrogen which is usually carried along with the air supplying oxygen to the reaction zone.

Commercially, I prefer to operate with a 1.25:1 manganese:phosphorus ratio. Operation with this ratio also gives optimum physical properties for the catalyst. These properties are somewhat greater density, allowing more catalytic material to be present for given volume of catalyst, and greater attrition resistance.

Although I prefer to operate with fluid bed operation may process should work very well in a fixed bed, ebulating bed, or moving bed type of operation. I prefer fluidized bed because I have a lot of experience with fluidized beds, and because problems of hot spots and distribution within the bed are minimized. Fluid bed operation also permits easy addition and withdrawal of catalyst if this is necessary to permit replacement or regeneration of catalyst.

Using my catalyst, it should be possible to use formaldehyde as a feed stock. The ammoxidation product will be the same as when a methanol feed is used, i.e., HCN. Other reactions which can be promoted using my catalyst include oxidation of alcohol to aldehydes and the ammoxidation of alcohols to nitriles.

EXAMPLE 1

Preferred Synthesis

A catalyst having the following composition:

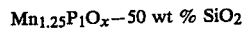

$Mn_{1.25}P_1O_x$—50 wt % $SiO_2$ was prepared in the following manner. 1424 grams of a 85 wt % phosphoric acid ($H_3PO_4$) solution and 741 grams of 40 wt % Nalco #2327 silica sol were added with virorous stirring to 5527 grams of a 50 wt % manganese nitrate solution ($Mn[NO_3]_2$). The mixture was heated at near 100 C. until the volume was reduced to around 3000 ml. during this period, the evolution of $NO_x$ gases occurred. The reaction mixture was cooled to near room temperature and 4201 grams of additional silica sol was added. The reaction mixture was ball milled for 16 hours to achieve homogeneity. The slurry was then spray-dried at a temperature of 120-150 C. The dried particles were then calcined at 935 C. for 2 hours in air. The resultant catalyst gave the best compromise between catalyst performance, stability, and physical properties. The following examples illustrate the effect of stoichiometry of the manganese phosphate catalyst on catalyst performance.

To a beaker containing 1200 g of Nalco #2327 40% silica sol was added 467 g of 85 wt % $H_3PO_4$ and 716 grams of a 50 wt % solution of $Mn(NO_3)_2$ with stirring. The pH of the slurry was adjusted to a value of ~3.7 with 57 wt % $NH_4OH$ solution. The slurry was cooked to reduce the volume and give a viscous slurry. This slurry was spray-dried, and the resultant catalyst was calcined in air 2 hours at 780 C. The catalyst had the following composition:

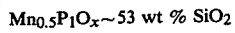

$Mn_{0.5}P_1O_x$~53 wt % $SiO_2$

EXAMPLE 3

To a beaker containing 715 g of a 50 wt % $Mn(NO_3)_2$ solution was added 251 g of a 85 wt % $H_3PO_4$ solution with stirring. The pH of the solution was raised to ~8 with ammonium hydroxide causing precipitation. The reaction mixture was cooked for ~1 hour, cooled, filtered and washed. The filer cake was added to a stirred vessel containing 720 g of Nalco #2327 40 wt % silica sol pH adjusted to 2 with 70% $HNO_3$. The catalyst slurry pH was maintained at ~3.5, cooked to reduce the volume, and dried in a flat dish. The pan-dried material was ground, sieved to 106 to 38 microns, and calcined for 2 hours at 780 C. in air. The catalyst composition was $Mn_{0.92}P_1O_x$~50 wt % $SiO_2$.

EXAMPLE 4

Repeat Example 3 using instead 231 g of 85 wt % $H_3PO_4$ and spray drying the slurry. The catalyst composition was $Mn_1P_1O_x$~50 wt % $SiO_2$.

EXAMPLE 5

To a stirred vessel containing 716 g of a 50 wt % solution of $Mn(NO_3)_2$ was added 230 g of $NH_4H_2PO_4$ and 710 g of Nalco #2327 40 wt % silica sol. The reaction mixture was heated between 80-90 C. to reduce volume, spray-dried and then calcined 2 hours at 950 C. in air. The catalyst composition was $Mn_1P_1O_x$~50 wt % $SiO_2$.

EXAMPLES 6-9

Repeat Example 5 using the following amounts:

"% HCN Selectivity" is defined as follows:

$$\frac{\text{moles HCN formed}}{\text{mols CH}_3\text{OH in feed} - \text{moles CH}_3\text{OH in effluent}} \times 100\%$$

| Catalyst No. | 2351631 | 1826673 | 1826675 | 1826672 | 1826693 | 1826695 | 1826694 | 1826690 | 1826689 | 1870788 |
|---|---|---|---|---|---|---|---|---|---|---|
| Rx Temp. °C. | 460 | 450 | 450 | 460 | 450 | 430 | 440 | 440 | 375 | 440 |
| Pres, psig | 10 | 10 | 10 | 10 | 10 | 10 | 10 | 10 | 10 | 10 |
| Feed, vol % | | | | | | | | | | |
| CH$_3$OH | 6.8 | 7.0 | 7.1 | 7.1 | 7.0 | 7.2 | 7.0 | 7.4 | 6.6 | 6.6 |
| NH$_3$ | 6.7 | 7.0 | 7.2 | 6.8 | 6.9 | 7.2 | 7.2 | 7.8 | 7.7 | 6.6 |
| O$_2$ | 18.6 | 18.0 | 18.8 | 18.9 | 19.0 | 19.3 | 19.1 | 18.7 | 19.6 | 18.0 |
| W/F, g-sec/ml | 4.0 | 3.3 | 3.3 | 4.0 | 3.3 | 3.3 | 3.3 | 3.3 | 3.0 | 3.3 |
| CH$_3$OH Conv. mol % | 99.5 | 99.0 | 81.0 | 97.0 | 99.5 | 99.3 | 99.1 | 98.7 | 100.0 | 99.0 |
| HCN | | | | | | | | | | |
| Selectivity mol % | 87.8 | 35.4 | 60.0 | 89.0 | 90.4 | 89.7 | 90.8 | 89.0 | 5.0 | 91.0 |
| Yield, mol % | 87.4 | 35* | 49.0* | 86.4 | 90.0 | 89.1 | 90.0 | 88.0 | 5.0 | 90.0 |
| Mn/P atomic ratio | 1.25 | 0.5 | 0.92 | 1 | 1 | 1.15 | 1.25 | 1.31 | 1.5 | 1.3 |
| Catalyst from Ex. | 1 | 2 | 3 | 4 | 5 | 6 | 7 | 8 | 9 | 10 |

*Performance declined with time.
NOTE:
Temperatures were scanned to obtain maximum HCN yields. Optimum temperatures for HCN yields were used.

| Ex. | NH$_4$H$_2$PO$_4$ | Nalco | Composition 50 wt % SiO$_2$ |
|---|---|---|---|
| 6 | 200 g | 664 g | Mn$_{1.15}$P$_1$O$_x$ |
| 7 | 184 g | 640 g | Mn$_{1.25}$P$_1$O$_x$ |
| 8 | 176 g | 625 g | Mn$_{1.31}$P$_1$O$_x$ |
| 9 | 154 g | 600 g | Mn$_{1.5}$P$_1$O$_x$ |

EXAMPLE 10

Alternate Preparation Method

To a stirred vessel containing 490.2 grams of manganese acetate (Mn[C$_2$H$_3$O$_2$]$_2$.4H$_2$O) dissolved in a liter of water was added 176.4 grams of a 85 wt % H$_3$PO$_4$ solution. A pink precipitate was formed. The reaction mixture was heated at 80+C. for ~1 hour, and then cooled. To the reaction mixture was added 625 grams of Nalco #2327 40 wt % silica sol adjusted to pH 3.7 with glacial acetic acid. The catalyst slurry was heated to reduce volume, spray-dried, and calcined in air 2 hours at 950 C. The catalyst composition was Mn$_{1.3}$PO$_x$ ~50 wt % SiO$_2$.

EXAMPLE 11

The catalyst of the examples was evaluated to determine the HCN yield and the methanol conversion in a fluidized bed reaction vessel having an inside diameter of about 14 mm. Approximately 25 grams of catalyst was used. A reactant mixture of approximately 18 volume % O$_2$, 7 vol. % ammonia and 7 vol. % methanol, and the balance helium, was passed upward through the catalyst bed to give the value of W/F reported. The reactor pressure is 10 psig, 1.68 atm, absolute.

"W/F" is defined as the weight of catalyst in grams divided by the flow rate of the reaction stream in ml/sec measured at STP.

"% CH$_3$OH Conversion" is defined as follows:

$$\frac{\text{mols CH}_3\text{OH in feed} - \text{mols CH}_3\text{OH in effluent}}{\text{mols CH}_3\text{OH in feed}} \times 100\%$$

"% HCN Yield" is defined as follows:

$$\frac{\text{mols HCN formed}}{\text{mols CH}_3\text{OH in feed}} \times 100\%$$

EXAMPLE 12

This example tested the ability of my catalyst for oxidation, specifically for the oxidation of methanol to formaldehyde.

The catalyst produced in the same way as the catalyst of Example 1, i.e., the Mn/P atomic ratio was 1.25:1. This catalyst was tested in a experimental apparatus similar to that used in Example 11. Reaction conditions included a temperature of 400 C., a pressure of 10 psig, 1.7 atm, absolute and at a W/F ratio of 3.0. The feed consisted of 7 vol. % methanol, 18 vol. % oxygen and the balance was helium. The methanol conversion was 100% with a formaldehyde yield of 77 mole %.

STRUCTURAL IMPLICATIONS

Although I am not sure, I speculate that there are some structural reasons for this catalyst's behavior. The best catalysts are found in the range of stoichiometry of a=1 to 1:5 in the composition Mn$_a$PO$_x$. This corresponds to structures Mn$_2$P$_2$O$_7$(a=1) to Mn$_3$(PO$_4$)-$_2$(a=15). The presence of the pyrophosphate (Mn$_2$P$_2$O$_7$) appears to be essential, but not *sufficient*, for good performance. At values of a=1, you will see the Mn$_2$P$_2$O$_7$ structure in the XRD, x-ray diffraction analysis, but the performance is very poor, possibly because of excess phosphorus oxides. At values of a 1.5, you exclusively have the Mn$_2$(PO$_4$)$_3$ phases plus excess manganese oxides. These are poor performance catalysts. At ~1≦a<1.5 you have mixtures of the two phases and less chance for formation of the free oxides of Mn and P. I do not want to be limited by these thoughts.

What is claimed is:

1. A process for the ammoxidation of methanol or formaldehyde feed to hydrogen cyanide comprising passing said feed along with ammonia and oxygen or oxygen-containing gas into an ammoxidation reaction zone operated at ammoxidation conditions in the presence of a catalyst consisting essentially of effective amounts of manganese and phosphorus and wherein the atomic ratio of manganese to phosphorus is within the range of 1:1 to 1.5:1.

2. Process of claim 1 wherein the ammoxidation catalyst comprises manganese and phosphorus oxides.

3. Process of claim 2 wherein the manganese and phosphorus oxides are on a support, and the support is 10 to 90 wt % of the catalyst.

4. Process of claim 3 wherein the support is silica.

5. Process of claim 2 wherein a silica support is 35 to 65 wt % of the catalyst.

6. Process of claim 2 wherein said feed is methanol, ammonia, and oxygen or oxygen-containing gas.

7. Process for the ammoxidation of methanol to hydrogen cyanide comprising feeding to an ammoxidation reactor operated at ammoxidation reaction conditions, a feed containing methanol, ammonia and oxygen or oxygen-containing gas and wherein the ammoxidation reaction zone contains a fluidized bed of ammoxidation catalyst consisting essentially of $Mn_aPO_x$ wherein a is 1 to 1.5 and x is the total number of the oxygen atoms in the oxides of the other atoms, and hydrogen cyanide is produced in the ammoxidation reaction zone as a product of the process.

8. Process of claim 7 wherein said catalyst is on an inert support, and said support comprises 10 to 90 wt % of said catalyst.

9. A process for the production of carbonyl compounds comprising passing a feed of an alcohol and oxygen or oxygen-containing gas into a reaction zone operated at oxidation conditions and containing a catalyst consisting essentially of effective amounts of manganese and phosphorus and wherein the atomic ratio of magnanese to phosphorus is within the range of 1:1 to 1.5:1.

10. Process of claim 9 wherein the ammoxidation catalyst comprises manganese and phosphorus oxides.

11. Process of claim 10 wherein the manganese and phosphorus oxides are on a support, and the support is 10 to 90 wt % of the catalyst.

12. Process of claim 11 wherein the support is silica.

13. Process of claim 11 wherein a silica support is 35 to 65 wt % of the catalyst.

14. Process of claim 11 wherein said alcohol is methanol and the carbonyl compound is formaldehyde.

* * * * *